United States Patent
Chen et al.

(10) Patent No.: US 9,606,660 B2
(45) Date of Patent: Mar. 28, 2017

(54) TOUCH DEVICE AND TOUCH DISPLAY APPARATUS

(71) Applicant: InnoLux Corporation, Miao-Li County (TW)

(72) Inventors: Yang-Chen Chen, Miao-Li County (TW); Chia-Hsiung Chang, Miao-Li County (TW); Kuei-Ling Liu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 42 days.

(21) Appl. No.: 14/639,212

(22) Filed: Mar. 5, 2015

(65) Prior Publication Data

US 2016/0170537 A1    Jun. 16, 2016

(30) Foreign Application Priority Data

Dec. 12, 2014  (TW) .............................. 103143431 A

(51) Int. Cl.
*G06F 3/041*    (2006.01)
*G06F 3/044*    (2006.01)

(52) U.S. Cl.
CPC ............ *G06F 3/0412* (2013.01); *G06F 3/044* (2013.01)

(58) Field of Classification Search
CPC .............. G06F 3/04; G06F 3/04; G06F 3/044
USPC ............ 345/173–178; 349/12; 174/255, 257; 257/40
See application file for complete search history.

(56) References Cited

U.S. PATENT DOCUMENTS

| 8,576,575 B2 | 11/2013 | Wu | |
|---|---|---|---|
| 2010/0251997 A1* | 10/2010 | Fujino | F02M 47/027 123/445 |
| 2012/0105356 A1* | 5/2012 | Brosnan | G06F 3/044 345/174 |
| 2012/0113050 A1* | 5/2012 | Wang | G06F 3/0412 345/174 |

(Continued)

FOREIGN PATENT DOCUMENTS

| JP | 2013105429 A | * | 5/2013 |
|---|---|---|---|
| TW | 201330723 | | 7/2013 |

(Continued)

OTHER PUBLICATIONS

Chinese language office action dated Nov. 16, 2015, issued application No. TW 103143431.

*Primary Examiner* — Prabodh M Dharia
(74) *Attorney, Agent, or Firm* — McClure, Qualey & Rodack, LLP

(57) ABSTRACT

Disclosed is a touch device including a substrate and a touch-sensing electrode layer thereon. The touch-sensing electrode layer includes at least one sensing electrode in a touch-sensing region, and at least one conducting line in a non-touch-sensing region. The conducting line is electrically connected to the sensing electrode. The non-touch-sensing region is located outside of the touch-sensing region, and the non-touch-sensing region includes a curve region connecting a first non-curve region and a second non-curve region. The conducting line has a first width in the first non-curve region, a second width in the second non-curve region, and a third width in the curve region, wherein the third width is greater than the first width and the second width.

12 Claims, 8 Drawing Sheets

(56) References Cited

U.S. PATENT DOCUMENTS

| | | | | |
|---|---|---|---|---|
| 2012/0154326 A1* | 6/2012 | Liu | G06F 3/0412 | 345/174 |
| 2012/0194464 A1* | 8/2012 | Liu | G06F 3/044 | 345/173 |
| 2013/0050147 A1* | 2/2013 | Tseng | G06F 3/0421 | 345/175 |
| 2013/0106743 A1* | 5/2013 | Xie | G06F 3/044 | 345/173 |
| 2013/0106780 A1* | 5/2013 | Hotelling | G06F 3/0416 | 345/174 |
| 2013/0154977 A1* | 6/2013 | Lee | G02F 1/133 | 345/173 |
| 2014/0022202 A1* | 1/2014 | Badaye | G06F 3/044 | 345/174 |
| 2014/0024280 A1* | 1/2014 | Wu | G02F 1/13338 | 445/24 |
| 2014/0110683 A1* | 4/2014 | Huang | G06F 3/041 | 257/40 |
| 2014/0150253 A1* | 6/2014 | Im | G06F 3/0412 | 29/830 |
| 2014/0299365 A1* | 10/2014 | Sebastian | G06F 3/044 | 174/255 |
| 2014/0320761 A1* | 10/2014 | Misaki | G06F 3/044 | 349/12 |
| 2014/0333328 A1* | 11/2014 | Nelson | G06F 3/044 | 324/663 |
| 2014/0375910 A1* | 12/2014 | Tada | G06F 3/044 | 349/12 |
| 2015/0237720 A1* | 8/2015 | Van Ostrand | G06F 3/044 | 174/257 |
| 2016/0034085 A1* | 2/2016 | Lee | G02F 1/133 | 349/12 |
| 2016/0070395 A1* | 3/2016 | Hung | G09G 5/003 | 345/173 |

FOREIGN PATENT DOCUMENTS

| | | |
|---|---|---|
| TW | 201443732 | 11/2014 |
| TW | M490612 | 11/2014 |

\* cited by examiner

TOUCH DEVICE AND TOUCH DISPLAY APPARATUS

CROSS REFERENCE TO RELATED APPLICATIONS

This application claims priority of Taiwan Patent Application No. 103143431, filed on Dec. 12, 2014, the entirety of which is incorporated by reference herein.

BACKGROUND

Technical Field

The disclosure relates to a touch device, and in particular it relates to the design of the conducting lines of the touch device.

Description of the Related Art

Conventional touch devices usually include a touch-sensing region, a bonding pad set, and a plurality of conducting lines on a substrate. The conducting lines may electrically connect the bonding pad set with a plurality of sensing electrodes in the touch-sensing region, and a plurality of bonding pads of the bonding pad set are usually electrically connected to an external circuit (e.g. a flexible circuit board), such that current or signals can be transferred from the external circuit to the touch-sensing region through the bonding pads and the conducting lines. As such, the touch device can be driven by the current or the signals.

In a conventional design, the conducting lines surrounding the touch-sensing region have a same width in all regions, and the adjacent conducting lines have a fixed space. On the other hand, general terminals of the conducting lines electrically connected to the sensing electrodes are rectangular-shaped. The above design easily accumulates a large amount of static charges, thereby negatively influencing the performance of the touch device by electrostatic discharge (ESD), and even damaging the touch device.

Accordingly, a novel design for conducting lines to prevent the conventional ESD problem is called-for.

BRIEF SUMMARY

One embodiment of the disclosure provides a touch device, comprising: a substrate and a touch-sensing electrode layer on the substrate. The touch-sensing electrode layer includes a plurality of sensing electrodes in a touch-sensing region, and a plurality of conducting lines in a non-touch-sensing region. The conducting lines are electrically connected to the corresponding sensing electrodes. The non-touch-sensing region is located outside of the touch-sensing region, and the non-touch-sensing region includes a curve region connecting a first non-curve region and a second non-curve region. The plurality of conducting lines comprise a first conducting line and a second conducting line adjacent to the first conducting line, the first conducting line and the second conducting line in the first non-curve region have a first space therebetween. The first conducting line and the second conducting line in the second non-curve region have a second space therebetween. The first conducting line and the second conducting line in the curve region have a third space therebetween, wherein the third space is greater than the first space and the second space.

One embodiment of the disclosure provides a touch display apparatus, comprising: a first substrate; an array layer disposed on the first substrate; a display medium layer disposed on the array layer; a second substrate disposed on the display medium layer; a protection layer disposed on the second substrate; and a touch-sensing electrode layer disposed between the protection layer and the first substrate. The touch-sensing electrode layer includes a plurality of sensing electrodes in a touch-sensing region, and a plurality of conducting lines in a non-touch-sensing region. The conducting lines are electrically connected to the corresponding sensing electrodes. The non-touch-sensing region is located outside of the touch-sensing region. The non-touch-sensing region includes a curve region connecting a first non-curve region and a second non-curve region. The adjacent conducting lines in the first non-curve region have a first space therebetween. The adjacent conducting lines in the second non-curve region have a second space therebetween. The adjacent conducting lines in the curve region have a third space therebetween, wherein the third space is greater than the first space and the second space. A color filter layer is disposed between the display medium layer and the second substrate, or disposed between the array layer and the display medium layer.

One embodiment of the disclosure provides a touch device, comprising: a substrate and a touch-sensing electrode layer on the substrate. The touch-sensing electrode layer includes a sensing electrode in a touch-sensing region, and a first conducting line in a non-touch-sensing region. The first conducting line is electrically connected to the sensing electrode. The non-touch-sensing region is located outside of the touch-sensing region, and the non-touch-sensing region includes a curve region connecting a first non-curve region and a second non-curve region. The first conducting line has a first width in the first non-curve region, a second width in the second non-curve region, and a third width in the curve region, wherein the third width is greater than the first width and the second width.

One embodiment of the disclosure provides a touch display apparatus, comprising: a first substrate; an array layer disposed on the first substrate; a display medium layer disposed on the array layer; a second substrate disposed on the display medium layer; a protection layer disposed on the second substrate; and a touch-sensing electrode layer disposed between the protection layer and the first substrate. The touch-sensing electrode layer includes a sensing electrode in a touch-sensing region, and a first conducting line in a non-touch-sensing region. The first conducting line is electrically connected to the sensing electrode. The non-touch-sensing region is located outside of the touch-sensing region, and the non-touch-sensing region includes a curve region connecting a first non-curve region and a second non-curve region. The first conducting line has a first width in the first non-curve region, a second width in the second non-curve region, and a third width in the curve region, wherein the third width is greater than the first width and the second width.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The scope of the disclosure is determined by reference to the appended claims.

Figure 1:
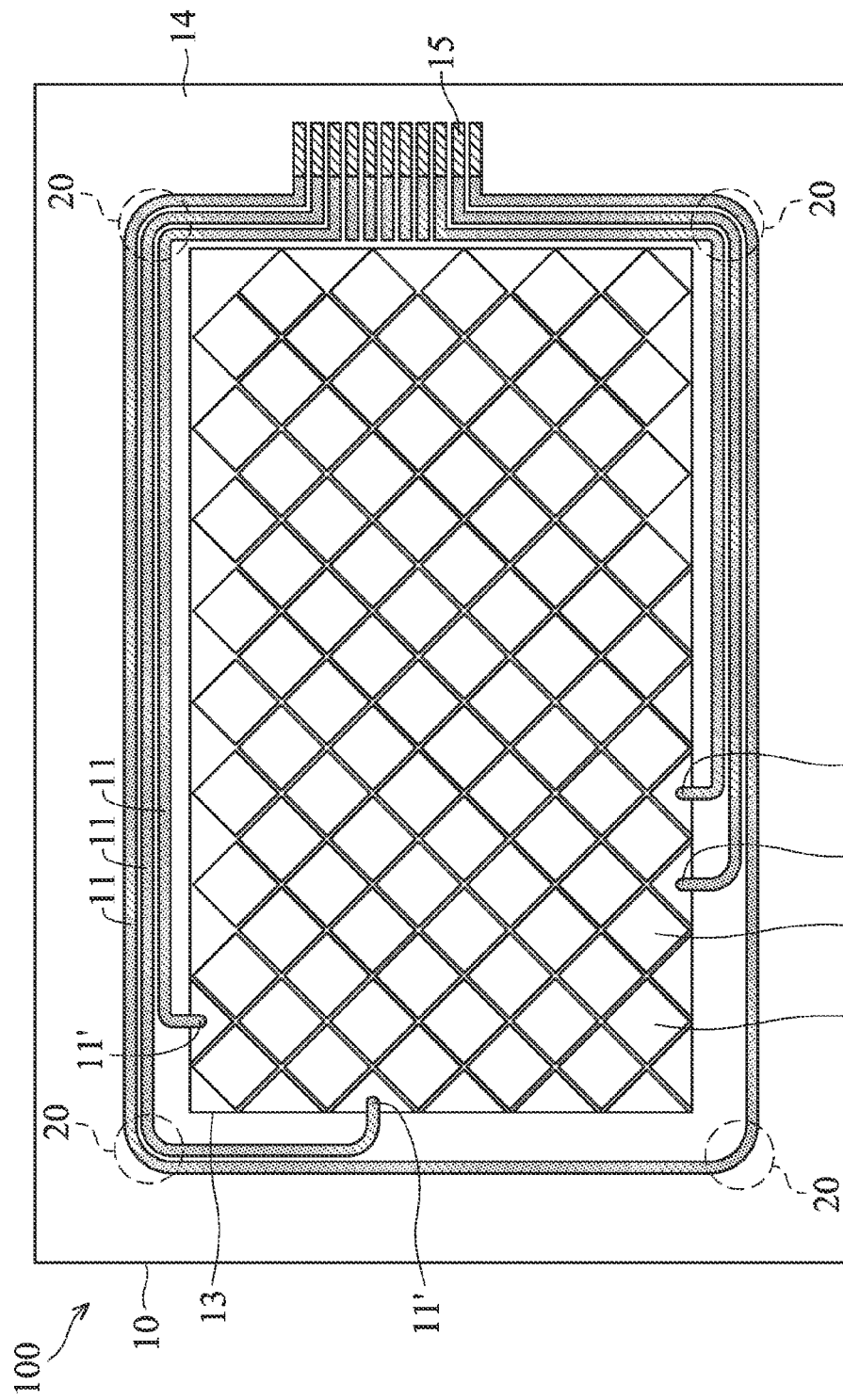
FIG. 1 shows a top-view of a touch device in one embodiment of the disclosure.

As shown in FIG. 1, a touch-sensing electrode layer on a substrate 10 of a touch device 100 includes a touch-sensing region 13 and a non-touch-sensing region 14 located outside of the touch-sensing region 13. In other embodiments, the non-touch-sensing region 14 may be located surrounding the touch-sensing region 13 or adjacent to the touch-sensing region 13. The touch-sensing region 13 includes at least one sensing electrode 131. Conducting lines 11 on the substrate 10 are located in the non-touch-sensing region 14, and are electrically connected to the sensing electrodes 131 in the touch-sensing region 13. Another terminal of the conducting lines 11 is electrically connected to bonding pads 15, and the bonding pads 15 can be further electrically connected to an external circuit such as a flexible circuit board (not shown). Current or signals of the external circuit can be transferred to the touch-sensing region 13 through the bonding pads 15 and the conducting lines 11 to drive the touch device 100, and signals produced by a user touching the touch-sensing region 13 can be also transferred to the external circuit through the conducting lines 11 and the bonding pads 15. In one embodiment, the substrate 10 can be glass or polymer film. In one embodiment, the conducting lines 11 can be aluminum, molybdenum, copper, silver, an alloy thereof, or a multi-layered structure thereof. The bonding pads 15 can be the same material of the conducting lines 11, or another electrically conducting material such as indium tin oxide (ITO) or indium zinc oxide (IZO). As shown in FIG. 1, terminals 11' of the conducting lines 11 electrically connecting to the sensing electrodes 131 are arc-shaped rather than rectangular-shaped, thereby preventing the accumulation of charges on the terminals 11'. It should be understood that the conducting lines 11 in FIG. 1 are only for illustration, and their real size, width, or spacing can be verified as shown in following embodiments.

Figure 2A:
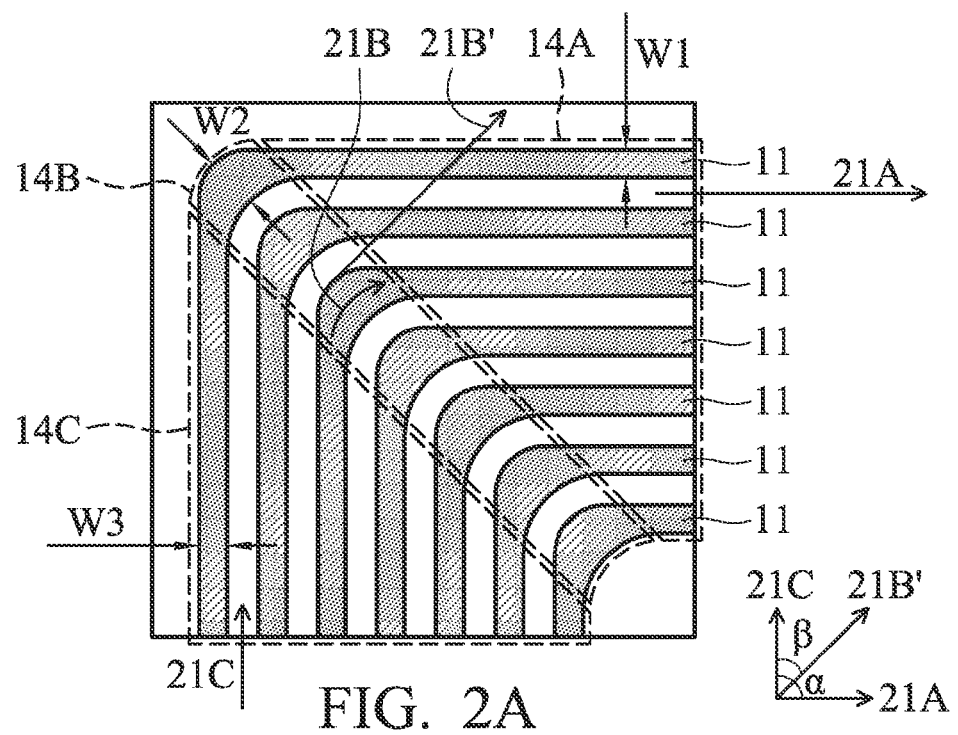
FIGS. 2A-2D show enlarged diagrams of a corner region in FIG. 1.

FIG. 2A shows an enlarged diagram of the corner region 20 in FIG. 1 of one embodiment. In FIG. 2A, the non-touch-sensing region 14 is divided to non-curve regions 14A and 14C and a curve region 14B, wherein the curve region 14B connects the two non-curve regions 14A and 14C. It is illustrated by the case of the outermost conducting line 11, which has a width W1 in the non-curve region 14A, a width W2 in the curve region 14B, and a width W3 in the non-curve region 14C. As shown in the FIG. 2A, the width W2 of the conducting line 11 in the curve region 14B is greater than the widths W1 and W3 of the conducting line 11 in the non-curve regions 14A and 14C. The width of the conducting line in the curve region is greater than the width of the conducting line in the non-curve region in the disclosure, thereby reducing the charge density per area unit of the conducting line in the curve region. As such, the charges do not easily accumulate in the curve region, and the ESD problem can be mitigated. It should be understood that the conducting lines 11 in the non-curve region 14A extend toward a direction 21A, the conducting lines 11 in the non-curve region 14C extend toward a direction 21C, and the conducting lines 11 in the curve region 14B extend toward a direction 21B. As shown in FIG. 2A, the direction 21A is different from the direction 21C, and the direction 21B is different from the directions 21A and 21C. The directions 21A and the 21C have an angle α therebetween, and the angle α is greater than 0° and less than 180°. Although the direction 21A is vertical to the direction 21C in FIG. 2A, the directions 21A and 21C may have another direction determined by the shape of the substrate 10 in FIG. 1. For example, if the substrate 10 is triangle, hexagon, octagon, or another polygon, the directions 21A and 21C will have other corresponding angles rather than being vertical to each other. Whatever the angle α between the directions 21A and 21C being, the direction 21B will gradually change from the direction 21C to the direction 21A. The conducting lines 11 in the curve region 14B have a tangent direction 21B', the direction 21C and the tangent direction 21B' have an angle β, and the angle β is greater than 0° and less than the angle α.

Figure 2B:
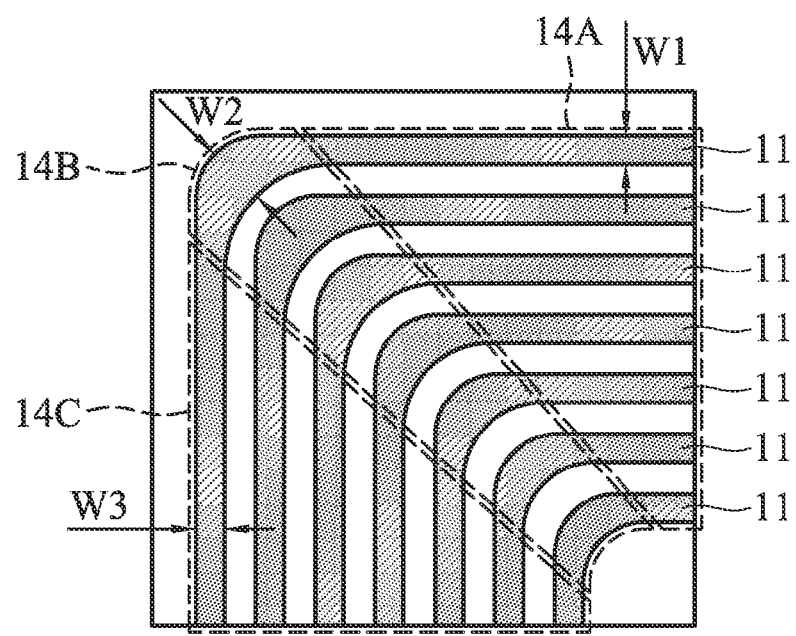

In one embodiment, the width W1 of the conducting lines 11 in the non-curve region 14A is similar to the width W3 of the conducting lines 11 in the non-curve region 14C. Moreover, the width of the inner conducting lines 11 is similar to the width of the outer conducting lines 11. In another embodiment, the outer conducting lines 11 (far away from the touch-sensing region) have a wider width, e.g. larger widths W1, W2, and W3. In other words, the inner conducting lines (closer to the touch-sensing region) have a narrower width, e.g. smaller widths W1, W2, and W3, as shown in FIG. 2B.

Figure 2C:
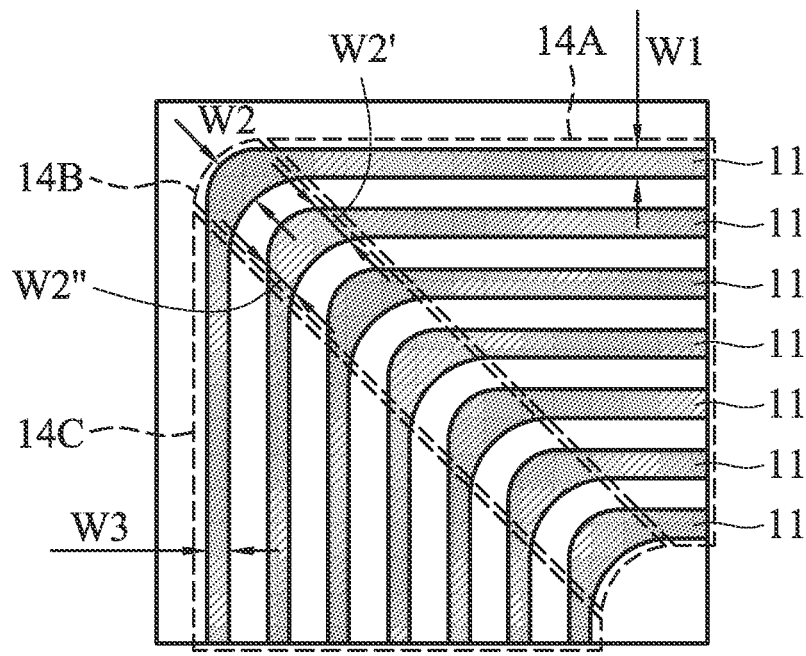
Figure 2D:
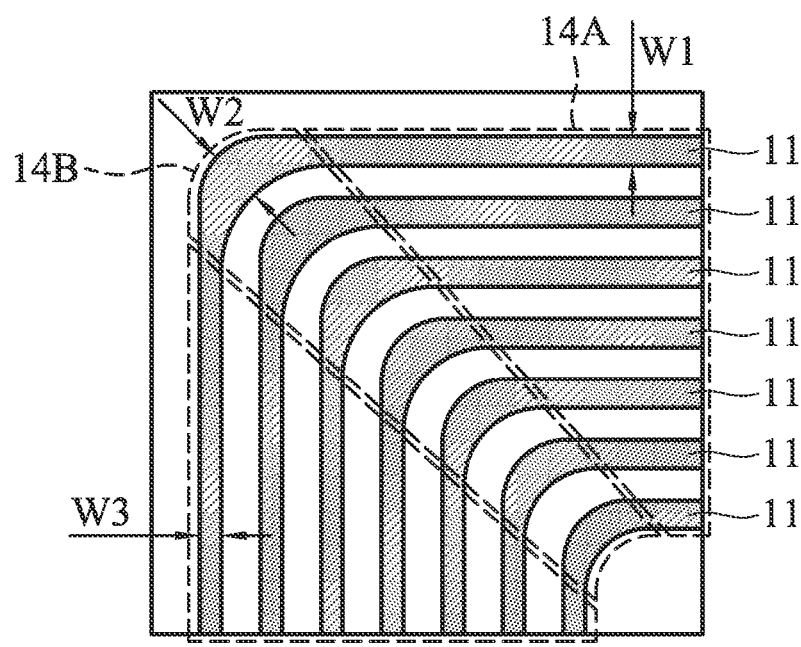

In one embodiment, the width W1 of the conducting lines 11 in the non-curve region 14A is greater than the width W3 of the conducting lines 11 in the non-curve region 14C, as shown in FIG. 2C. As such, the width W2' of the conducting lines 11 in the curve region 14B adjacent to the non-curve region 14A is greater than the width W2" of the conducting lines 11 in the curve region 14B adjacent to the non-curve region 14C. In one embodiment, the concept of FIG. 2B (the outer conducting lines have a greater width) and the concept in FIG. 2C (the widths of the conducting lines in different non-curve regions are different) can be combined, as shown in FIG. 2D.

Figure 3A:
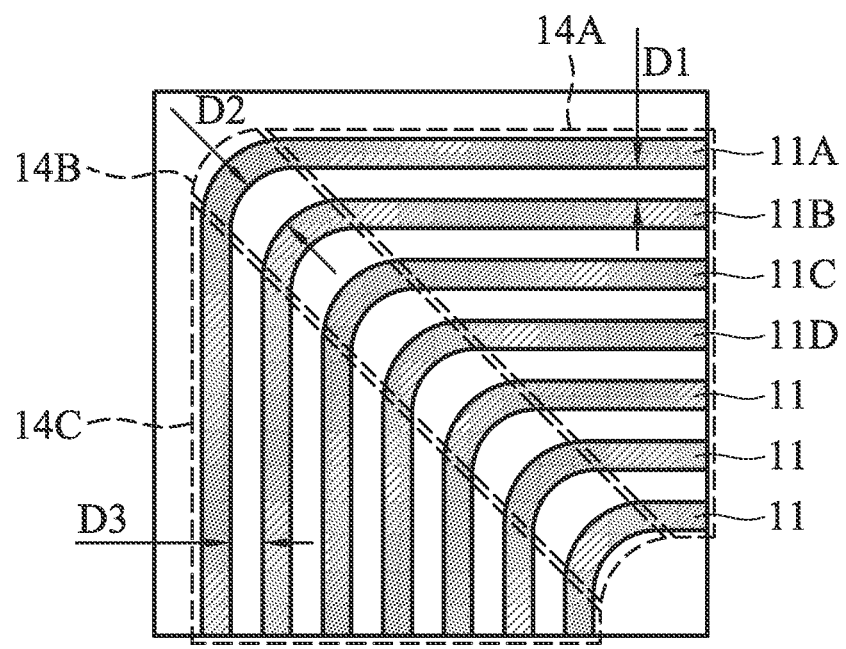
FIGS. 3A-3D show enlarged diagrams of a corner region in FIG. 1.

FIG. 3A shows an enlarged diagram of the corner region 20 in FIG. 1 of one embodiment. In FIG. 3A, the non-touch-sensing region 14 is divided to non-curve regions 14A and 14C and a curve region 14B, wherein the curve region 14B connects the two non-curve regions 14A and 14C. It is illustrated by the case of the two outermost conducting lines 11 (e.g. the first conducting line 11A and the second conducting line 11B), which have a space D1 therebetween in the non-curve region 14A, a space D2 therebetween in the curve region 14B, and a space D3 therebetween in the non-curve region 14C. As shown in the FIG. 3A, the space D2 between the two adjacent conducting lines 11 (e.g. the first conducting line 11A and the second conducting line 11B) in the curve region 14B is greater than the spaces D1 and D3 between the two adjacent conducting lines 11 (e.g. the first conducting line 11A and the second conducting line 11B) in the non-curve regions 14A and 14C. The space between the two adjacent conducting lines (e.g. the first conducting line 11A and the second conducting line 11B) in the curve region is greater than the space between the two adjacent conducting lines (e.g. the first conducting line 11A and the second conducting line 11B) in the non-curve region in the disclosure, thereby reducing the coupling problem of the two adjacent conducting lines (e.g. the first conducting line 11A and the second conducting line 11B) in the curve region. As such, the ESD problem can be prevented. Definitions of the extending directions of the conducting lines 11 in the non-curve regions 14A and 14C and the curve region 14B, the tangent direction of the conducting lines 11 in the curve region 14B, the angle between the extending directions of the conducting lines 11 in the non-curve regions 14A and 14C, and the angle between the extending direction of the conducting lines 11 in the non-curve region 14A and the tangent direction of the conducting lines 11 in the curve region 14B are similar to that in FIG. 2A and the related description was therefore omitted here.

Figure 3B:
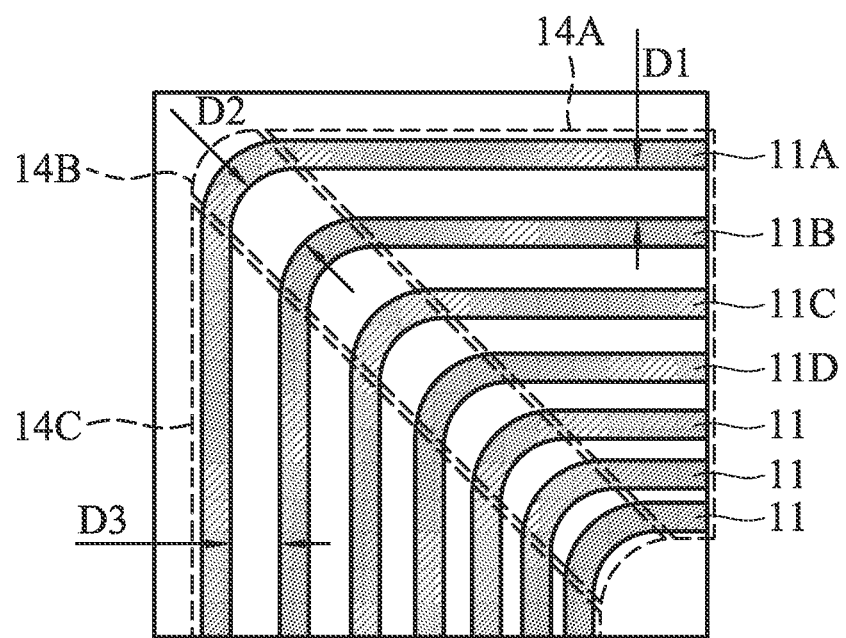

In one embodiment, the space D1 between the two adjacent conducting lines (e.g. the first conducting line 11A and the second conducting line 11B) in the non-curve region 14A is similar to the space D3 between the two adjacent conducting lines (e.g. the first conducting line 11A and the second conducting line 11B) in the non-curve region 14C, and the space between the two adjacent inner conducting lines 11 (e.g. the third conducting line 11C and the fourth conducting line 11D) are similar to the space between the two adjacent outer conducting lines 11 (e.g. the first conducting line 11A and the second conducting line 11B). In another embodiment, the two adjacent outer conducting lines 11 (away from the touch-sensing region, e.g. the first conducting line 11A and the second conducting line 11B) have a wider space therebetween, e.g. larger spaces D1, D2, and D3. In other words, the two adjacent inner conducting lines 11 (closer to the touch-sensing region, e.g. the third conducting line 11C and the fourth conducting line 11D) have a narrower space therebetween, e.g. smaller spaces D1, D2, and D3, as shown in FIG. 3B.

Figure 3C:
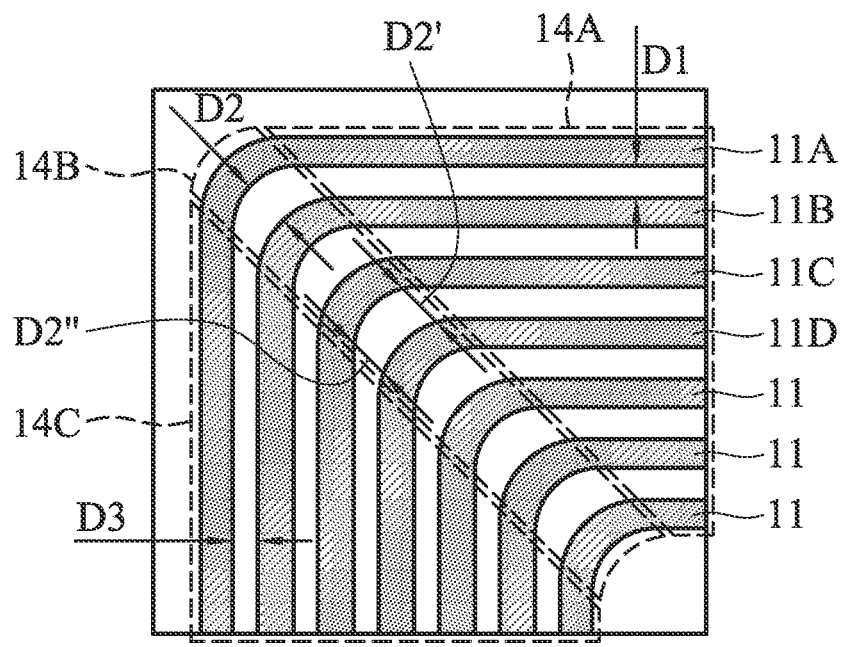
Figure 3D:
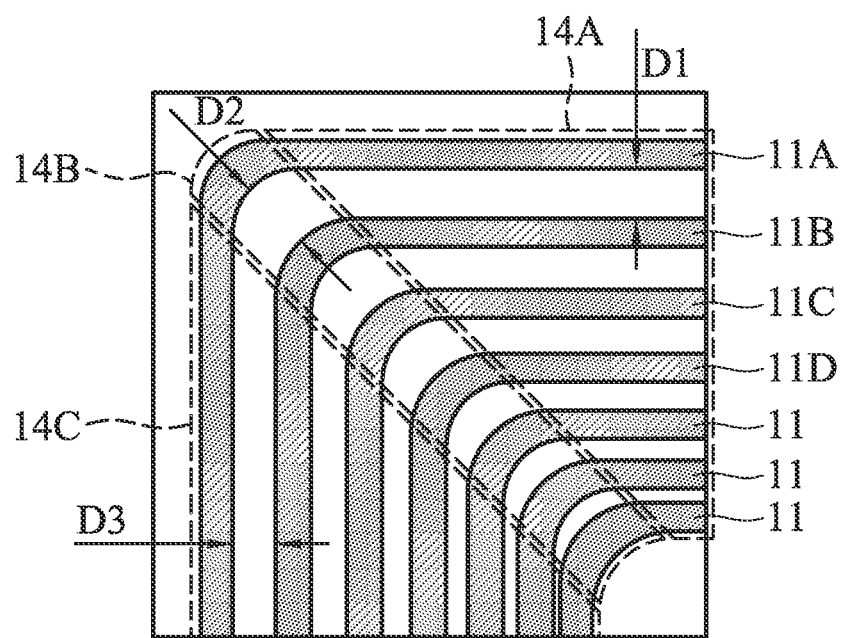

In one embodiment, the space D1 between the two adjacent conducting lines 11 in the non-curve region 14A is greater than the space D3 between the conducting lines 11 in the non-curve region 14C, as shown in FIG. 3C. As such, the space D2' between the two adjacent conducting lines 11 in the curve region 14B adjacent to the non-curve region 14A is greater than the space D2" between the two adjacent conducting lines 11 in the curve region 14B adjacent to the non-curve region 14C. In one embodiment, the concept of FIG. 3B (the outer adjacent conducting lines, e.g. the first conducting line 11A and the second conducting line 11B, have a greater space therebetween) and the concept in FIG. 3C (the spaces of the adjacent conducting lines in different non-curve regions are different) can be combined, as shown in FIG. 3D.

In addition, the concept in FIGS. 2A-2D (the conducting lines in the curve region have a greater width) and the concept in FIGS. 3A-3D (the two adjacent conducting lines in the curve region have a greater space therebetween) can be combined. In one embodiment, a conducting line having a greater width will have a greater space with the conducting line adjacent to it.

Figure 4A:
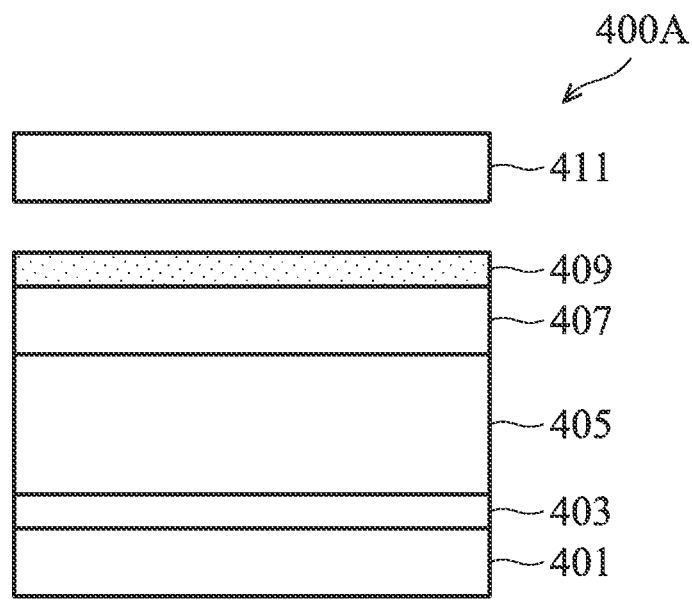
FIGS. 4A-4F show touch display apparatuses in embodiments of the disclosure.

The touch device 100 can be collocated in any existing touch display apparatus. As shown in FIG. 4A, a touch display device 400A in one embodiment may include a substrate 401, an array layer 403 (e.g. TFT layer) disposed on the substrate 401, a display medium layer 405 (e.g. liquid crystal layer or organic light-emitting diode) disposed on the array layer 403, a substrate 407 disposed on the display medium layer 405, a touch-sensing electrode layer 409 disposed on the substrate 407, and a protection layer 411 disposed on the touch-sensing electrode layer 409. In the touch display apparatus 400A, the touch-sensing electrode layer 409 and the substrate 407 are the described touch-sensing electrode layer and the substrate 10 of the touch device 100, wherein the touch-sensing electrode layer 409 may include electrodes Tx and Rx arranged in two different directions. The touch-sensing electrode layer 409 can be a stack of the electrodes Tx and Rx, or coplanar electrodes Tx and Rx.

Figure 4B:
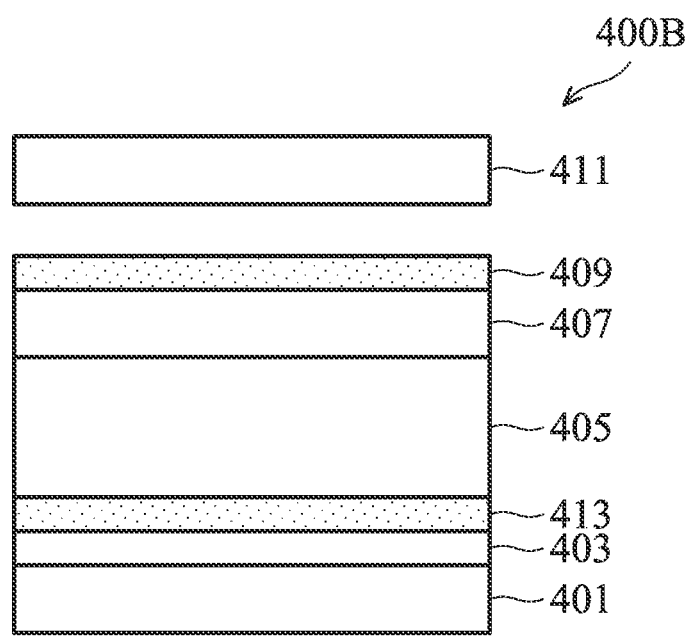

As shown in FIG. 4B, a touch display device 400B in one embodiment may include a substrate 401, an array layer 403 disposed on the substrate 401, a touch-sensing electrode layer 413 disposed on the array layer 403, a display medium layer 405 (e.g. liquid crystal layer or organic light-emitting diode) disposed on the touch-sensing electrode layer 413, a substrate 407 disposed on the display medium layer 405, a touch-sensing electrode layer 409 disposed on the substrate 407, and a protection layer 411 disposed on the touch-sensing electrode layer 409. In the touch display apparatus 400B, the touch-sensing electrode layer 409 and the substrate 407 (or the touch-sensing electrode layer 413 and the substrate 401) is the touch-sensing electrode layer and the substrate 10 of the described touch device 100.

In the touch display apparatuses 400A and 400B, a color filter layer (not shown) can be disposed between the display medium layer 405 and the substrate 407, wherein the substrate 407 is the so-called color filter (CF) substrate. In other embodiments, the color filter layer can be disposed between the array layer 403 and the display medium layer 405 (e.g. the COA substrate).

Figure 4C:
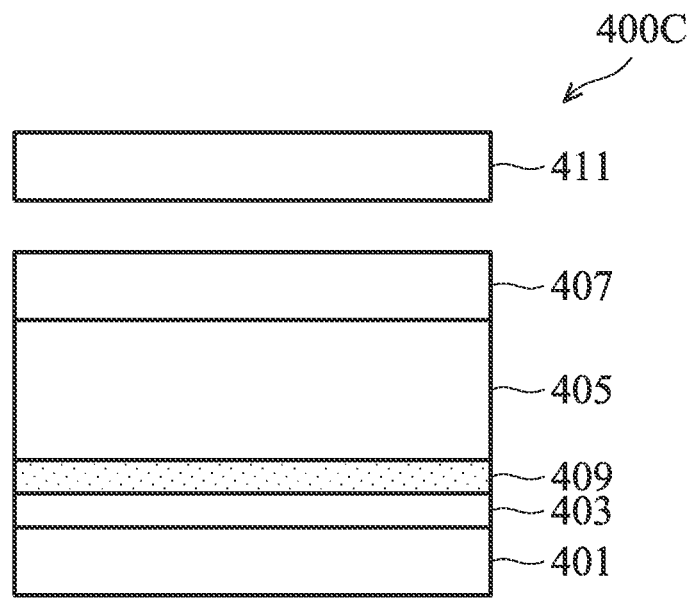

As shown in FIG. 4C, a touch display device 400C in one embodiment may include a substrate 401, an array layer 403 disposed on the substrate 401, a display medium layer 405 (e.g. liquid crystal layer or organic light-emitting diode) disposed on the array layer 403, a substrate 407 disposed on the display medium layer 405, and a protection layer 411 disposed on the substrate 407. The above touch display device 400C further includes a touch-sensing electrode layer 409 disposed between the array layer 403 and the display medium layer 405. In the touch display apparatus 400C, the touch-sensing electrode layer 409 and the substrate 401 is the touch-sensing electrode layer and the substrate 10 of the described touch device 100, wherein the touch-sensing electrode layer 409 may include electrodes Tx and Rx arranged in two different directions. The touch-sensing electrode layer 409 can be a stack of the electrodes Tx and Rx, or coplanar electrodes Tx and Rx, and the touch-sensing electrode layer 409 and the array layer 403 can be coplanar.

In the touch display apparatuses 400C, a color filter layer (not shown) can be disposed between the display medium layer 405 and the substrate 407, wherein the substrate 407 is the so-called color filter (CF) substrate. In other embodiments, the color filter layer can be disposed between the array layer 403 and the display medium layer 405 (e.g. the COA substrate).

Figure 4D:
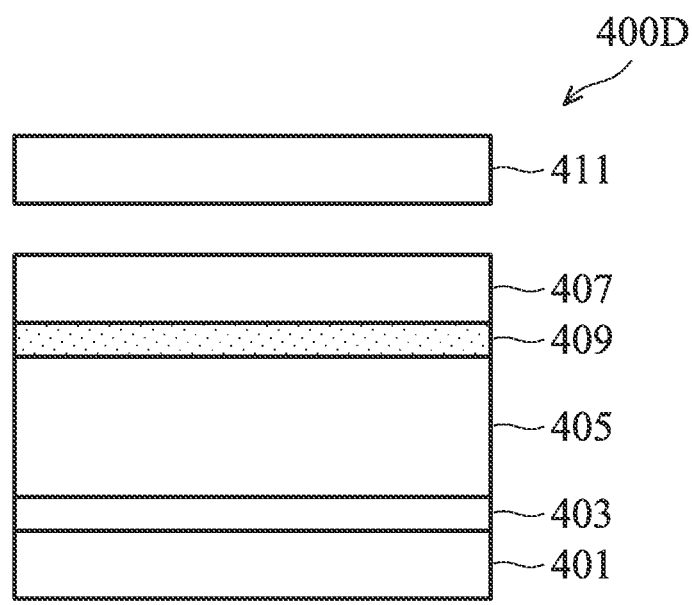

As shown in FIG. 4D, a touch display device 400D in one embodiment may include a substrate 401, an array layer 403 disposed on the substrate 401, a display medium layer 405 (e.g. liquid crystal layer or organic light-emitting diode) disposed on the array layer 403, a substrate 407 disposed on the display medium layer 405, and a protection layer 411 disposed on the substrate 407. The above touch display device 400D further includes a touch-sensing electrode layer 409 disposed between the display medium layer 405 and the substrate 407, wherein the touch-sensing electrode layer 409 can be a stack of the electrodes Tx and Rx, or coplanar electrodes Tx and Rx. In the touch display apparatus 400D, the touch-sensing electrode layer 409 and the substrate 407 is the touch-sensing electrode layer and the substrate 10 of the described touch device 100.

In the touch display apparatuses 400D, a color filter layer (not shown) can be disposed between the display medium layer 405 and the substrate 407, wherein the substrate 407 is the so-called color filter (CF) substrate. In other embodiments, the color filter layer can be disposed between the array layer 403 and the display medium layer 405 (e.g. the COA substrate).

Figure 4E:
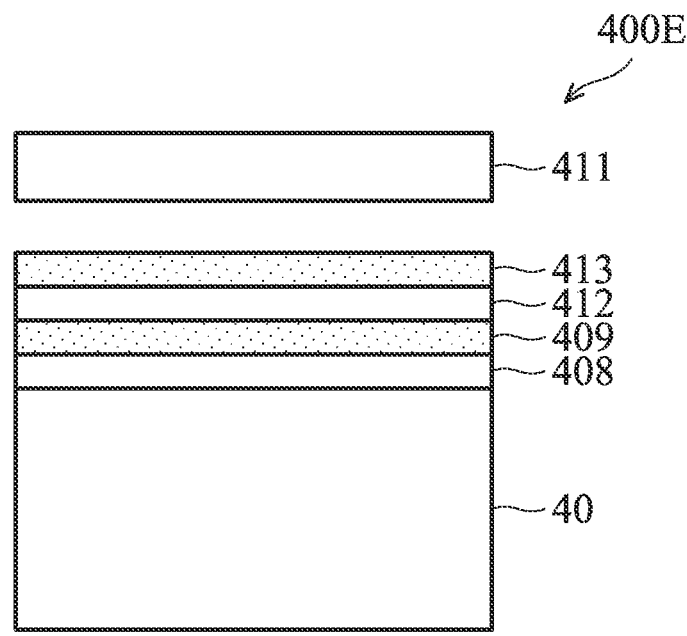

As shown in FIG. 4E, a touch display device 400E in one embodiment may include a touch-sensing electrode layer 409 disposed on a thin film 408, and the thin film 408 is disposed on a display device 40. A touch-sensing electrode layer 413 is disposed on a thin film 412, and the thin film 412 is disposed on the touch-sensing electrode layer 409. A protection layer 411 is disposed on the touch-sensing electrode layer 413. In one embodiment, the touch-sensing electrode layer 409 and the thin film 408 can be the touch-sensing electrode layer and the substrate 10 of the touch device 100, or the touch-sensing electrode layer 413 and the thin film 412 can be the touch-sensing electrode layer and the substrate 10 of the touch device 100. In one embodiment, the display device 40 can be electronic paper, electronic reader, electroluminescent display (ELD), organic electroluminescent display (OELD), vacuum fluorescent display (VFD), light emitting diode display (LED), cathode ray tube (CRT), liquid crystal display (LCD), plasma display panel (PDP), digital light processing (DLP) display, liquid crystal on silicon (LCoS), organic light-emitting diode (OLED), surface-conduction electron-emitter display (SED), field emission display (FED), quantum dot laser TV, Liquid crystal laser TV, ferro liquid display (FLD), interferometric modulator display (iMoD), thick-film dielectric electroluminescent (TDEL), quantum dot light emitting diode (QD-LED), telescopic pixel display (TPD), organic light-emitting transistor (OLET), electrochromic display, laser phosphor display (LPD), or the like.

Figure 4F:
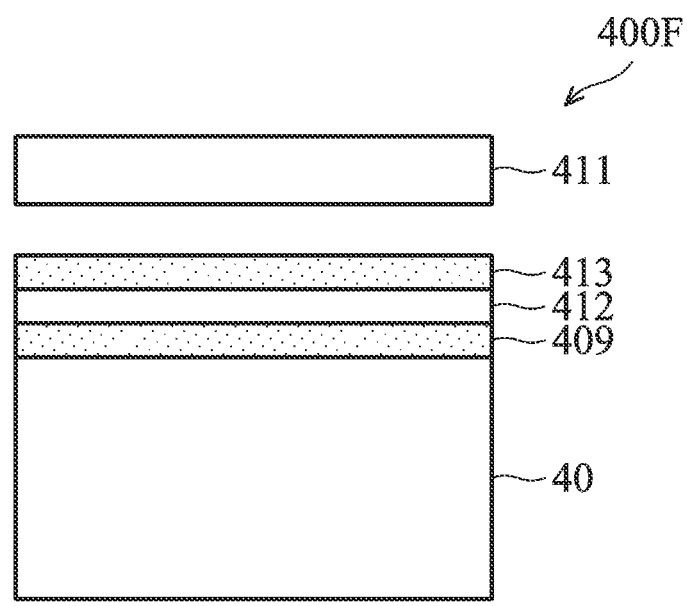

As shown in FIG. 4F, a touch display device 400F in one embodiment may include a touch-sensing electrode layer 409 disposed on a display device 40. A thin film 412 is disposed on the touch-sensing electrode layer 409. A touch-sensing electrode layer 413 is disposed on the thin film 412, and a protection layer 411 is disposed on the touch-sensing electrode layer 413. In the touch display apparatus 400F, the touch-sensing electrode layer 409 or 413 is the touch-sensing electrode layer of the described touch device 100, and the thin film 412 is the substrate 10 of the described touch device 100. The display device 40 of the touch display apparatus 400F are similar to that described above and the related description was therefore omitted here. In the embodiment, the electrodes of the touch-sensing electrode layer 409 and the electrodes of the touch-sensing electrode layer 413 can be arranged in different directions. For example, the touch-sensing electrode layer 409 can be Tx, and the touch-sensing electrode layer 413 can be Rx. Alternately, the touch-sensing electrode layer 409 can be Rx, and the touch-sensing electrode layer 413 can be Tx.

The above touch display apparatuses are for illustration only, rather than limiting the disclosure. It should be understood that the touch device 100 may collocate with other display device. Because the conducting lines in the curve region have a larger width and space than the conducting lines in the non-curve region, and the terminals of the conducting lines electrically connecting to the sensing electrodes are arc-shaped, the sensing electrode layer of the touch device including the design of the above conducting lines may efficiently prevent the ESD problem in the conventional art.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch device, comprising:
a substrate; and
a touch-sensing electrode layer on the substrate,
wherein the touch-sensing electrode layer includes a plurality of sensing electrodes in a touch-sensing region, and a plurality of conducting lines in a non-touch-sensing region,
wherein the conducting lines are electrically connected to the corresponding sensing electrodes,
wherein the non-touch-sensing region is located outside of the touch-sensing region, and the non-touch-sensing region includes a curve region connecting a first non-curve region and a second non-curve region,
wherein the plurality of conducting lines comprise a first conducting line and a second conducting line adjacent to the first conducting line, the first conducting line and the second conducting line in the first non-curve region have a first space therebetween, the first conducting line and the second conducting line in the second non-curve region have a second space therebetween, and the first conducting line and the second conducting line in the curve region have a third space therebetween,
wherein the third space is greater than the first space and the second space, a terminal of the first conducting line is overlapping and electrically connecting to one of the plurality of sensing electrodes, and the terminal of the first conducting line is arc-shaped.

2. The touch device as claimed in claim 1, wherein the first conducting line in the first non-curve region extends toward a first direction, the first conducting line in the second non-curve region extends toward a second direction, the first direction and the second direction have a first angle therebetween, and the first angle is greater than 0° and less than 180°, the first conducting line in the curve region has a tangent direction, the tangent direction and the second direction have a second angle therebetween, and the second angle is greater than 0° and less than the first angle.

3. The touch device as claimed in claim 1, wherein the first space is greater than the second space.

4. The touch device as claimed in claim 1, wherein the first conducting line has a first width in the first non-curve region, a second width in the second non-curve region, and a third width in the curve region, wherein the third width is greater than the first width and the second width.

5. The touch device as claimed in claim 4, wherein the first width is greater than the second width.

6. A touch display apparatus, comprising:
a first substrate;
an array layer disposed on the first substrate;
a display medium layer disposed on the array layer;
a second substrate disposed on the display medium layer;
a protection layer disposed on the second substrate;
a touch-sensing electrode layer disposed between the protection layer and the first substrate;
wherein the touch-sensing electrode layer includes a plurality of sensing electrodes in a touch-sensing region, and a plurality of conducting lines in a non-touch-sensing region,
wherein the conducting lines are electrically connected to corresponding sensing electrodes, wherein the non-touch-sensing region is located outside of the touch-sensing region, and the non-touch-sensing region includes a curve region connecting a first non-curve region and a second non-curve region, wherein the plurality of conducting lines comprise a first conducting line and a second conducting line adjacent to the first conducting line, the first conducting line and the second conducting line in the first non-curve region have a first space therebetween, the first conducting line and the second conducting line in the second non-curve region have a second space therebetween, and the first conducting line and the second conducting line in the curve region have a third space therebetween, wherein the third space is greater than the first space and the second space, a terminal of the first conducting line is overlapping and electrically connecting to one of the plurality of sensing electrodes, and the terminal of the first conducting line is arc-shaped; and a color filter layer disposed between the display medium layer and the second substrate, or disposed between the array layer and the display medium layer.

7. The touch display apparatus as claimed in claim 6, wherein the touch-sensing electrode layer is disposed between the protection layer and the second substrate, disposed between the second substrate and the display medium layer, or disposed between the display medium layer and the first substrate.

8. The touch display apparatus as claimed in claim 6, wherein the touch-sensing electrode layer includes a first touch-sensing electrode layer and a second touch-sensing electrode layer, the first touch-sensing electrode layer is disposed between the second substrate and the display medium layer, the second touch-sensing electrode layer is disposed between the second substrate and the protection layer, and the second substrate is a thin film.

9. The touch display apparatus as claimed in claim 8, further comprising:

a third substrate disposed between the first touch-sensing electrode layer and the display medium layer, and the third substrate is another thin film.

10. A touch device, comprising:

a substrate; and a touch-sensing electrode layer on the substrate, wherein the touch-sensing electrode layer includes a sensing electrode in a touch-sensing region, and a first conducting line in a non-touch-sensing region, wherein the first conducting line is electrically connected to the sensing electrode, wherein the non-touch-sensing region is located outside of the touch-sensing region, and the non-touch-sensing region includes a curve region connecting a first non-curve region and a second non-curve region, the first conducting line in the first non-curve region extends toward a first direction, the first conducting line in the second non-curve region extends toward a second direction, the first direction and the second direction have a first angle therebetween, and the first angle is greater than 0° and less than 180°, the first conducting line in the curve region has a tangent direction, the tangent direction and the second direction have a second angle therebetween, and the second angle is greater than 0° and less than the first angle, and the first conducting line in the curve region has two curved edges, wherein the first conducting line has a first width in the first non-curve region, a second width in the second non-curve region, and a third width in the curve region, wherein the third width is greater than the first width and the second width.

11. The touch device as claimed in claim 10, wherein the first width is greater than the second width.

12. The touch device as claimed in claim 10, wherein a terminal of the first conducting line is overlapping and electrically connecting to the sensing electrode, and the terminal of the first conducting line is arc-shaped.

* * * * *